US010392996B2

(12) United States Patent
Nakata

(10) Patent No.: US 10,392,996 B2
(45) Date of Patent: Aug. 27, 2019

(54) PARTICULATE DETECTION DEVICE

(71) Applicant: DENSO CORPORATION, Kariya, Aichi-pref. (JP)

(72) Inventor: Shingo Nakata, Kariya (JP)

(73) Assignee: DENSO CORPORATION, Kariya (JP)

( * ) Notice: Subject to any disclaimer, the term of this patent is extended or adjusted under 35 U.S.C. 154(b) by 31 days.

(21) Appl. No.: 15/547,872

(22) PCT Filed: Jan. 21, 2016

(86) PCT No.: PCT/JP2016/000282

§ 371 (c)(1),
(2) Date: Aug. 1, 2017

(87) PCT Pub. No.: WO2016/125436

PCT Pub. Date: Aug. 11, 2016

(65) Prior Publication Data

US 2018/0016960 A1 Jan. 18, 2018

(30) Foreign Application Priority Data

Feb. 2, 2015 (JP) .................................. 2015-18297

(51) Int. Cl.
*F01N 9/00* (2006.01)
*F01N 3/027* (2006.01)
(Continued)

(52) U.S. Cl.
CPC ............ *F01N 9/002* (2013.01); *F01N 3/027* (2013.01); *F01N 3/101* (2013.01); *F01N 11/007* (2013.01);
(Continued)

(58) Field of Classification Search
USPC .................. 60/276, 277, 285, 295, 297, 311
See application file for complete search history.

(56) References Cited

U.S. PATENT DOCUMENTS

2012/0186230 A1 7/2012 Yahata et al.
2013/0036805 A1* 2/2013 Yoshioka ............... F01N 3/023
73/114.31
(Continued)

FOREIGN PATENT DOCUMENTS

JP 2009-144577 7/2009
JP 2010-106687 5/2010
JP 2012-77668 4/2012

*Primary Examiner* — Binh Q Tran
(74) *Attorney, Agent, or Firm* — Nixon & Vanderhye P.C.

(57) ABSTRACT

A particulate detection device has an insulation part, electrodes, an adhesion amount calculation section, a heater and a controller. The insulation part is located in an exhaust passage of an internal combustion engine and has an adhesion surface to which exhaust particulates emitted from the internal combustion engine adhere. The adhesion amount calculation section calculates an adhesion amount of the exhaust particulates adhered to the insulation part based on an electrical resistance between two of the electrodes. The controller, in a normal control, controls an air/fuel ratio in the internal combustion engine to be a theoretical air/fuel ratio. The controller, in a regeneration control, controls the heater to increase a temperature of the insulation part and removes the exhaust particulates from the insulation part by burning the exhaust particulates, and controls the air/fuel ratio to be lean as compared to the theoretical air/fuel ratio.

5 Claims, 5 Drawing Sheets

(51) Int. Cl.
*F01N 3/10* (2006.01)
*F01N 11/00* (2006.01)
*F02D 41/14* (2006.01)
*F02D 41/02* (2006.01)
*F02D 41/22* (2006.01)

(52) U.S. Cl.
CPC ..... *F02D 41/1466* (2013.01); *F02D 41/1494* (2013.01); *F02D 41/029* (2013.01); *F02D 41/222* (2013.01); *Y02T 10/22* (2013.01)

(56) References Cited

U.S. PATENT DOCUMENTS

| | | | | |
|---|---|---|---|---|
| 2013/0086888 | A1* | 4/2013 | Lee | F01N 11/00 60/274 |
| 2014/0305106 | A1* | 10/2014 | Hashida | F01N 3/023 60/301 |
| 2015/0211405 | A1* | 7/2015 | Yoshidome | F01N 11/00 73/114.69 |
| 2016/0245722 | A1* | 8/2016 | Hanawa | F01N 11/00 |

* cited by examiner

PARTICULATE DETECTION DEVICE

CROSS REFERENCE TO RELATED APPLICATION

This application is the U.S. national phase of International Application No. PCT/JP2016/000282 filed on Jan. 21, 2016 which designated the U.S. and claims priority to Japanese Patent Application No. 2015-018297 filed on Feb. 2, 2015, the entire contents of each of which are incorporated herein by reference.

TECHNICAL FIELD

The present disclosure relates to a particulate detection device that detects an amount of exhaust particulates exhausted from an internal combustion engine.

BACKGROUND ART

Recently, regulations are being tight as to a requirement of reducing an amount of exhaust particulates (i.e., Particulate Matter) exhausted from an internal combustion engine. The regulations are tough especially in Europe, such that a quantity of the exhaust particulates is restricted in addition to a weight of the exhaust particulates. The same toughening of the regulations is expected even in Japan from now on. To respond to the toughening of the regulations, it is considered to collect the exhaust particulates by disposing a particulate filter (i.e., GPF: Gasoline Particle Filter) in an exhaust passage in addition to restricting a generation of the exhaust particulates by controlling air/fuel ratio in the internal combustion engine. Regarding vehicles mounting a diesel engine, it is already common to dispose the particulate filter in the exhaust passage, and the particulate filter has a great effect.

However, when the particulate filter is broken in some cases and a particulate collection performance of the particulate filter deteriorates, the quantity of the exhaust particulates passing through the particulate filter and emitted to an outside the vehicle may increase. The particulate filter may be broken in a case that a part of the particulate filter is broken when the exhaust particulates collected by the particulate filter are burnt and a temperature of the part of the particulate filter increases excessively. Then, it is considered to dispose a particulate detection device so as to detect a failure of the particulate filter promptly. The particulate detection device uses a particulate sensor that is located downstream of the particulate filter in the exhaust passage and detects an amount of the exhaust particulates.

Patent Literature 1 discloses a particulate detection device that has a particulate sensor having electrodes. The particulate sensor has an electrical insulating part having a plate shape, and the electrodes are arranged on a surface of the electrical insulating part to be distanced from each other. The exhaust particulates are a conductor including carbon as a base. Accordingly, electrical resistance between the electrodes adjacent to each other decreases when the exhaust particulates are attached on the surface of the electrical insulation part and accumulated in a portion between the electrodes. That is, an accumulated amount of the exhaust particulates on the electrical insulation part and the electrical resistance between the electrodes correlate with each other. Regarding an internal combustion engine of Patent Literature 1, the particulate detection device detects the amount of the exhaust particulates accumulated on the surface of the electrical insulation part, i.e., an amount of the exhaust particulates in the exhaust passage, based on the electrical resistance between the electrodes. The electrical resistance is actually a current value that is detected while voltage is applied between the electrodes.

According to the particulate sensor having the above-described configuration, the electrical resistance between the electrodes is decreased as the exhaust particulates are accumulated, and then the current detected increases and is saturated eventually. That is, the current stops increasing eventually, i.e., the electrical resistance stops decreasing, even if the accumulated amount of the exhaust particulates continues increasing. Therefore, it is necessary to regenerate the particulate sensor in order to continue detecting the amount of the exhaust particulates. The regeneration is performed by removing the exhaust particulates in a manner that the exhaust particulates are burnt by heating the electrical insulation part routinely. The process to regenerate the particulate sensor will be referred to as "regeneration treatment". The particulate sensor disclosed in Patent Literature 1 has a heater heating the electrical insulation part and performs the regeneration treatment using the heater.

PRIOR ART LITERATURES

Patent Literature

Patent Literature 1: JP 2009-144577 A

SUMMARY OF INVENTION

The regeneration treatment is a treatment in which the accumulated exhaust particulates are burnt and removed. That is, there is a premise of performing the treatment that oxygen is present around the electrical insulation part. The particulate sensor disclosed in Patent Literature 1 is premised on being mounted in the vehicle having the diesel engine as the internal combustion engine. Exhaust gas emitted from the diesel engine includes relatively great amount of oxygen, therefore the exhaust particulates can be burnt when being heated by the heater.

In contrast, when using a gasoline engine, an amount of oxygen in exhaust gas emitted from the internal combustion engine is very small since the gasoline engine performs combustion (i.e., stoichiometric combustion) with a theoretical air/fuel ratio. In addition, a three-way catalyst is arranged upstream of the particulate sensor and the particulate filter, and an amount of oxygen reaching the particulate filter is almost zero since the oxygen is used by an oxidation reaction in the three-way catalyst.

Accordingly, when the electrical insulation part is heated by the heater to perform the regeneration treatment, the exhaust particulates may not be burnt and the accumulated particulates may not be removed. As a result, a detection of the amount of the exhaust particulates may not be restarted.

The present disclosure addresses the above-described matters, and it is an objective of the present disclosure to provide a particulate detection device that is capable of burning accumulated exhaust particulates and removing the accumulated exhaust particulates even in a case that the particulate detection device is located in an exhaust passage of an internal combustion engine performing combustion with a theoretical air/fuel ratio.

A particulate detection device according to an embodiment of the present disclosure detects an amount of exhaust particulates emitted from an internal combustion engine. The particulate detection device has an insulation part, electrodes, an adhesion amount calculation section, a heater, and a controller. The insulation part is located in an exhaust passage of the internal combustion engine and has an adhesion surface to which the exhaust particulates adhere. The electrodes are arranged to be distanced from each other on the adhesion surface. The adhesion amount calculation section calculates an adhesion amount of the exhaust particulates adhered to the insulation part based on an electrical resistance between two of the plurality of electrodes. The heater heats the insulation part. The controller controls an operation of the internal combustion engine and an operation of the heater. The controller, in a normal control, controls an air/fuel ratio in the internal combustion engine to be a theoretical air/fuel ratio. The controller, in a regeneration control, controls the heater to increase a temperature of the insulation part and removes the exhaust particulates, adhering to the insulation part, by burning the exhaust particulates, and controls the air/fuel ratio to be lean as compared to the theoretical air/fuel ratio.

In the regeneration control, the heater heats the insulation part on a condition that the air/fuel ratio in the internal combustion engine is temporary made become lean as compared to the theoretical air/fuel ratio. Accordingly, a relatively large amount of oxygen is present around the insulation part, and thereby the accumulated exhaust particulates are burnt and removed when being heated. As a result, the particulate detection device is regenerated and can detect the amount of the exhaust particulates again.

Thus, the present disclosure can provide the particulate detection device that can burn and remove the accumulated exhaust particulates in the exhaust passage of the internal combustion engine in which combustion is performed at the theoretical air/fuel ratio.

DESCRIPTION OF EMBODIMENTS

Embodiments of the present disclosure will be described hereinafter referring to drawings. In the embodiments, a part that corresponds to or equivalents to a part described in a preceding embodiment may be assigned with the same reference number, and a redundant description of the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

A particulate detection device 100 according to a first embodiment of the present disclosure is configured as a device that detects an exhausted amount of exhaust particulates emitted from an internal combustion engine (i.e., an engine 10) of a vehicle GC and that detects a failure of a particulate filter 32 described later. The exhaust particulates will be referred to as particulates simply hereafter. The exhaust particulates may be carbon particulates generated by combustion and having a micro diameter. A configuration of the vehicle GC will be described hereafter referring to FIG. 1.

Figure 1:
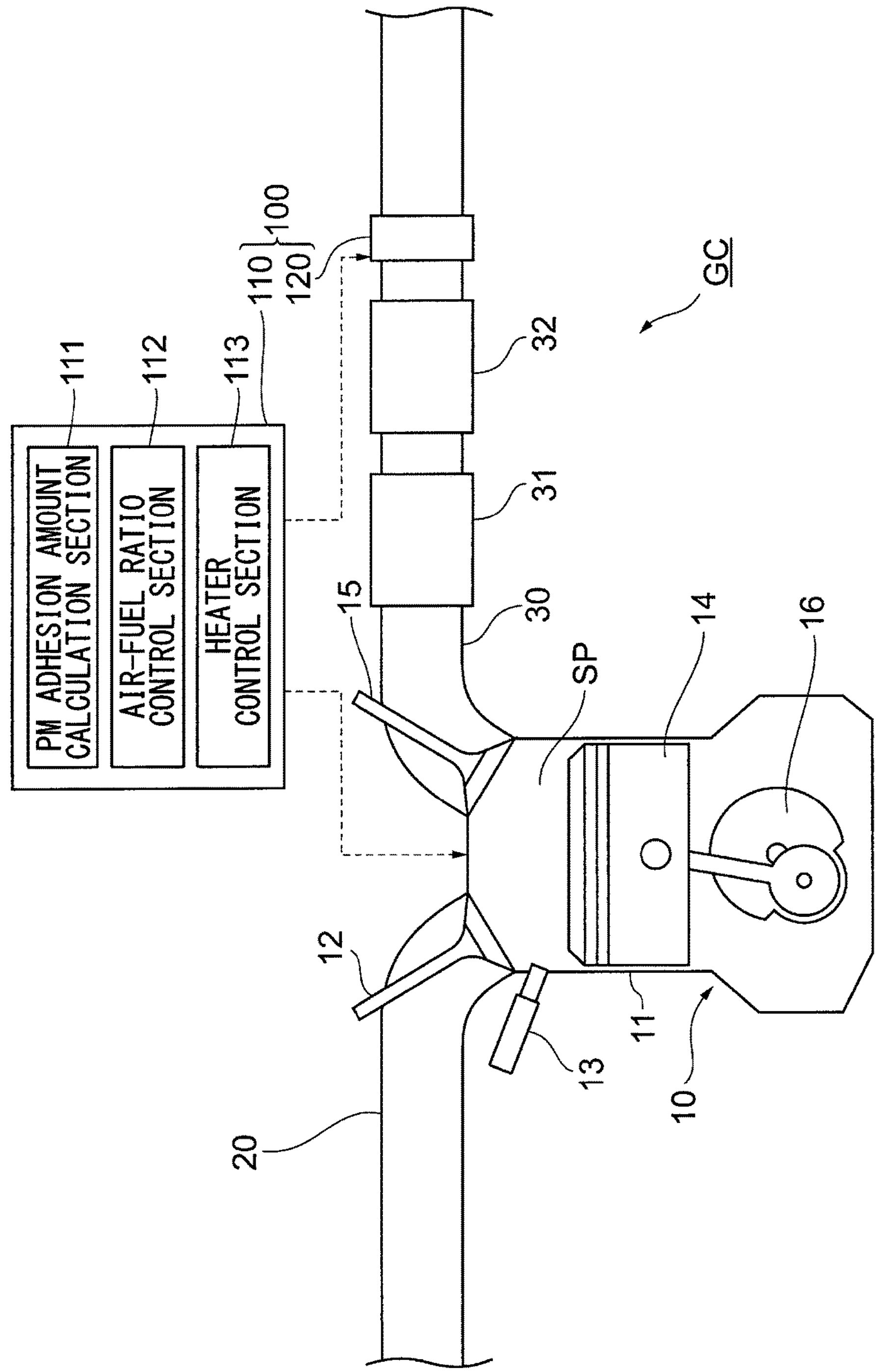
FIG. 1 is a diagram illustrating a particulate detection device according to a first embodiment of the present disclosure and a configuration of a vehicle in which the particulate detection device is mounted.

In FIG. 1, the engine 10 and a peripheral configuration of the engine 10 are schematically illustrated and illustrations of other configurations are omitted. As shown in FIG. 1, the vehicle GC has the engine 10, a suction pipe 20, and an exhaust pip 30.

The engine 10 is a so-called four-cycle reciprocating engine that is a gasoline engine generating kinetic energy. The engine 10 generates the kinetic energy in a manner that fuel, which is a mixture of gasoline and air, is combusted and expanded in cylinders 11. The engine 10 has more than one cylinder 11, however one of the cylinders 11 is illustrated in FIG. 1. Each of the cylinders 11 has a suction valve 12, an injector 13, a piston 14, and an exhaust valve 15. Each of the cylinders 11 defines a combustion chamber SP in which the fuel is combusted.

The suction valve 12 is a switching valve located between the suction pipe 20 and the combustion chamber SP. When the suction valve 12 is open, air flows from the suction pipe 20 into the combustion chamber SP.

The injector 13 is an injection valve that injects the fuel into the combustion chamber SP. A pressure of the fuel is increased by a fuel pump (not shown) and then the fuel is supplied to the injector 13. When the injector 13 is open, the fuel in the injector 13 is injected directly into the combustion chamber SP. The injection of fuel by the injector 13 is performed in conjunction with an open/close operation of the suction valve 12. The air introduced from the suction pipe 20 and the fuel injected from the injector 13 are mixed in the combustion chamber SP.

The piston 14 is located in a lower area of the combustion chamber SP in each cylinder 11. When the piston 14 rises, the mixture of the fuel and air is compressed in the combustion chamber SP. Subsequently, an igniter (not shown) ignites the mixture and then the mixture is combusted in the combustion chamber SP. As a result, a volume of the mixture increases, and thereby the piston 14 is pushed to move downward and then a crankshaft 16 attached to the piston 14 rotates. Rotational force of the crankshaft 16 is used as power generated by the engine 10 and moves the vehicle GC.

The exhaust valve 15 is a switching valve located between the exhaust pipe 30 and the combustion chamber SP. When the exhaust valve 15 is open, exhaust gas generated by the combustion is emitted from the combustion chamber SP to the exhaust pipe 30.

The suction pipe 20 is a pipe that supplies air to the cylinders 11 of the engine 10. The suction pipe 20 has a throttle valve (not shown) therein. A volume of the air supplied to the cylinders 11 of the engine 10 is changed in a manner that the throttle valve is open and closed by operating an acceleration pedal by a driver.

The exhaust pipe 30 is a pipe that emits the exhaust gas, which is generated by the combustion in the combustion chamber SP, to outside the vehicle GC. A three-way catalyst 31, a particulate filter 32, and a sensor unit 120 are attached to the exhaust pipe 30 in this order from an upstream side, i.e., a side adjacent to the engine 10.

The three-way catalyst 31 purifies harmful substances such as carbon hydride, carbon monoxide, and nitrogen oxide included in the exhaust gas by oxidizing and reducing the harmful substances. The three-way catalyst 31 has a catalyst carrier (not shown) therein. The catalyst carrier supports platinum, palladium and rhodium as catalytic agents. The carbon hydride, carbon monoxide and the nitrogen oxide included in the exhaust gas are purified in the three-way catalyst 31 and then flow to a downstream side of the three-way catalyst 31.

The particulate filter 32 is located downstream of the three-way catalyst 31 in the exhaust pipe 30. The particulate filter 32 is a filter that collects particulates included in the exhaust gas.

The sensor unit 120 is a part of the particulate detection device 100 and is located downstream of the particulate filter 32 in the exhaust pipe 30. The sensor unit 120 determines an amount of the particulates on the downstream side of the particulate filter 32. That is, the sensor unit 120 determines the amount of the particulates that passes through the particulate filter 32 without being caught. The amount of the particulates determined by the sensor unit 120 increases when the particulate filter 32 is broken in some cases, and thereby a collection performance collecting the particulates deteriorates.

A configuration of the particulate detection device 100 will be described hereafter. The particulate detection device 100 has the sensor unit 120 and a controller 110.

Figure 2:
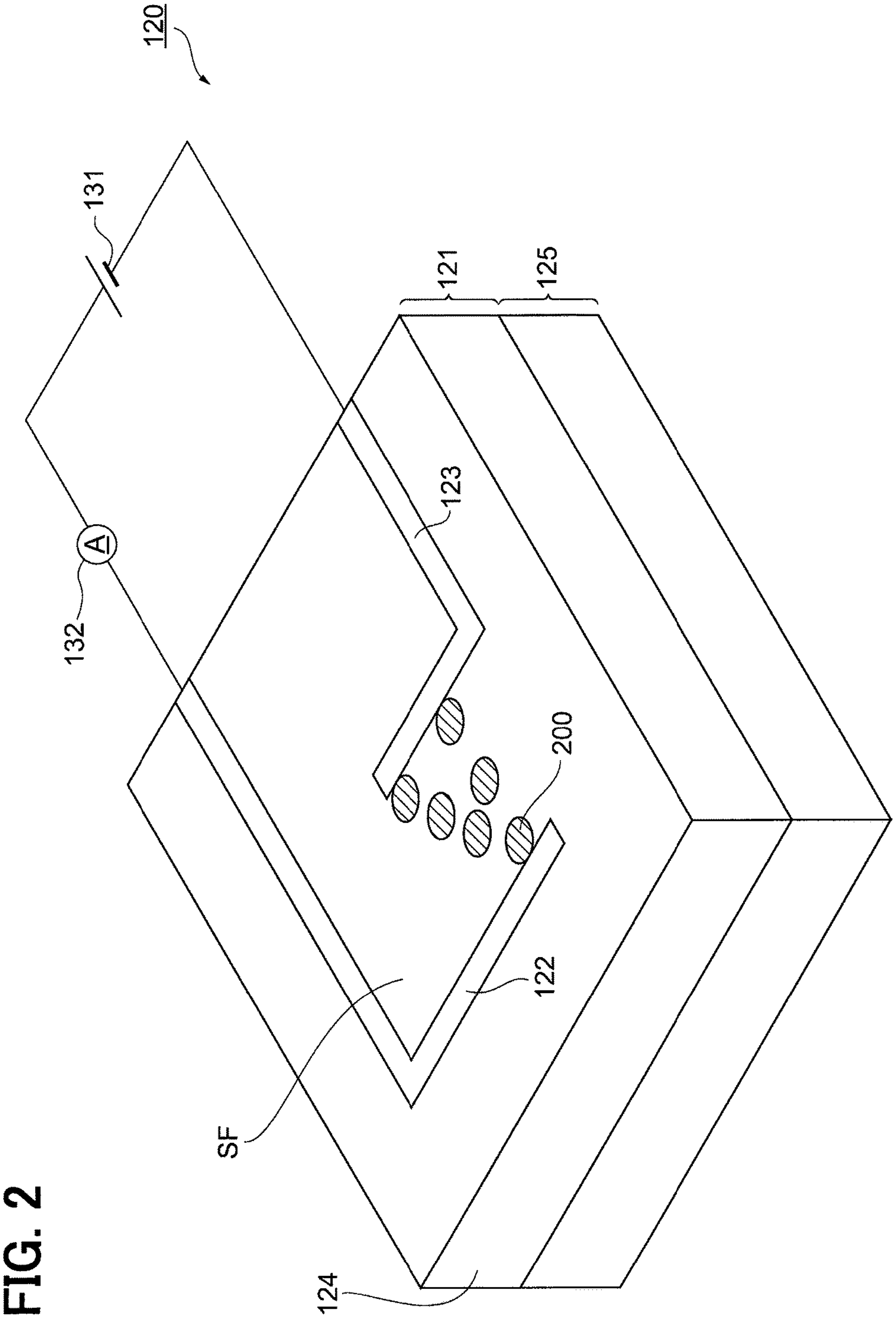
FIG. 2 is a diagram schematically illustrating a configuration of the particulate detection device according to the first embodiment.

As described above, the sensor unit 120 determines the amount of the particulates on the downstream side of the particulate filter 32 in the exhaust pipe 30. As shown in FIG. 2, the sensor unit 120 has a sensor 121 and a heater 125.

The sensor 121 has an electrical insulation part 124 and two electrodes 122, 123 that are arranged to be distanced from each other on a surface of the electrical insulation part 124. The surface of the electrical insulation part 124 to which the two electrodes 122, 123 are attached is an adhesion surface SF to which the particulates adhere.

A power source 131 applies DC voltage to the two electrodes 122, 123. A power supply path connects the electrode 122 to the power source 131 and has an ammeter 132 that measures a current flowing in the power supply path. A current value detected by the ammeter 132 is input to the controller 110.

The heater 125 is an electric heater having a plate shape and is located along a surface of the electrical insulation part 124 facing the adhesion surface SF. When current is applied to the heater 125, the heater 125 generates heat, and thereby a temperature of the heater 125 and a temperature of the electrical insulation part 124 rise. A heat generation of the heater 125 is controlled by the controller 110. In a normal condition (i.e., a normal control), current is not applied to the heater 125 and the heat generation is not performed. The heater 125 generates heat in a regeneration control described later. The normal condition may be a condition in which a determination of the amount of the particulates is performed.

The controller 110 is a computing system that has CPU, ROM, RAM and an input-output interface. The controller has, as functional control blocks, an adhesion amount calculation section 111, an air/fuel ratio control section 112, and a heater control section 113. The adhesion amount calculation section 111 calculates an amount (i.e., particulate adhesion amount) of the particulates adhering to the adhesion surface SF based on the current value detected by the sensor 121. The current value detected by the sensor 121 is, in other words, a detected value detected by the ammeter 132. The way to calculate the particulate adhesion amount will be described later.

The air/fuel ratio control section 112 is a control block that controls an air/fuel ratio in the engine 10. Specifically, the air/fuel ratio control section 112 operates a control to make the air/fuel ratio coincide with a target value by adjusting an amount of the fuel injected from the injector 13 into the engine 10. In the normal condition, the air/fuel ratio control section 112 performs a control (i.e., a stoichiometric operation) to make the air/fuel ratio in the engine 10 coincide with the theoretical air/fuel ratio.

The heater control section 113 adjusts a level of the current applied to the heater 125 and thereby controlling a heat generation amount in the heater 125.

A measurement principle for determining the particulate amount by the particulate detection device 100 will be described hereafter. As described above, the power source 131 applies DC voltage to the electrodes 122, 123.

When the particulates are not adhered to the adhesion surface SF of the electrical insulation part 124, the electrode 122 and the electrode 123 are insulated from each other. Accordingly, an electrical resistance between the electrode 122 and the electrode 123 is substantially infinity. As a result, the current value detected by the ammeter 132 is zero.

The particulates include carbon as a base, thereby having electric conductivity. Accordingly, the electric resistance between the electrode 122 and the electrode 123 gradually decreases as the amount of the particulates adhering (i.e., accumulating) to the adhesion surface SF increases. As a result, the current value detected by the ammeter 132 gradually increases. In FIG. 2, the particulates adhering to the adhesion surface SF is illustrated schematically and assigned with a reference number 200. The particulates adhering to the adhesion surface SF may be referred to as “the particulate 200” hereafter.

Figure 3:
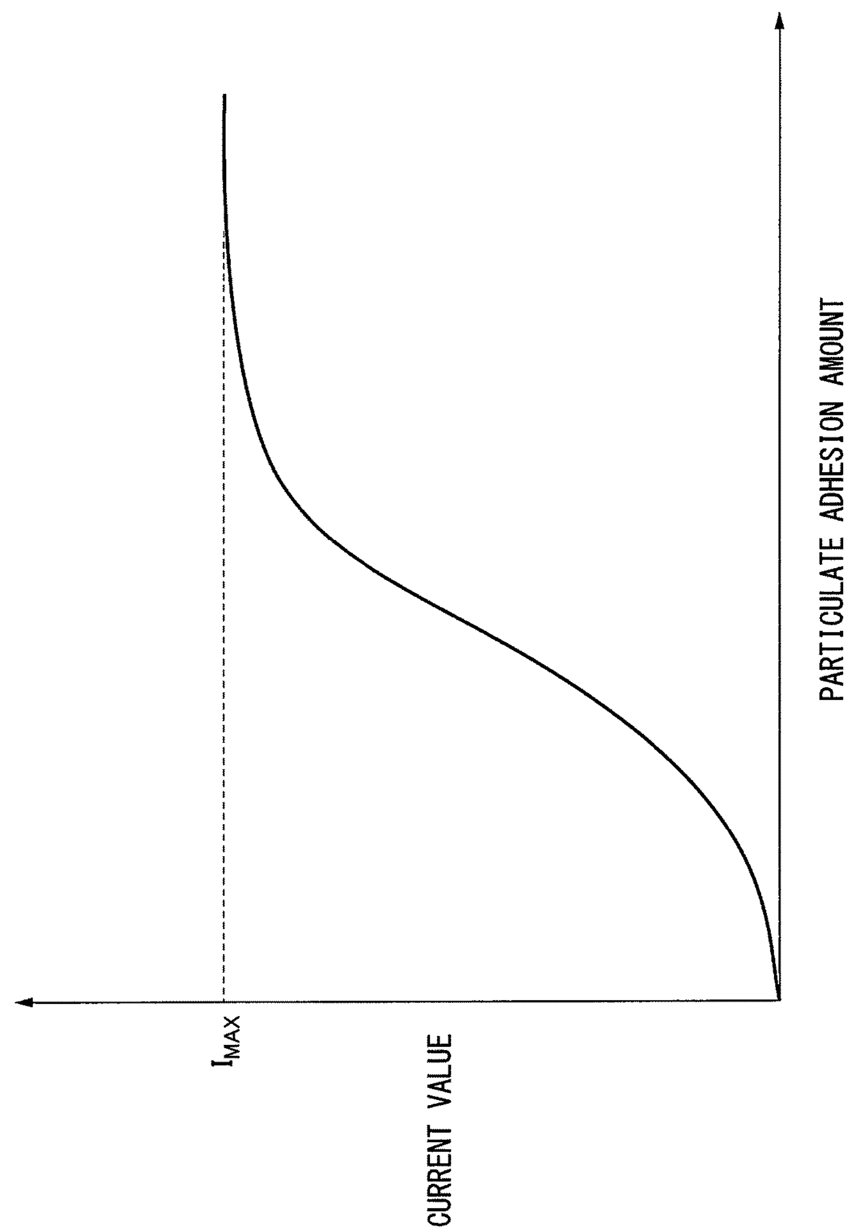
FIG. 3 is a graph showing a relationship between a particulate adhesion amount adhering to a sensor part and a current value according to the first embodiment.

FIG. 3 is a graph showing a correlation between the current value detected by the ammeter 132 and the particulate amount adhered to the surface of the electrical insulation part 124 (i.e., the amount of the particulates passing through the particulate filter 32). A vertical axis shows the current value detected by the ammeter 132, and a horizontal axis shows the particulate amount adhering (i.e., accumulating) to the adhesion surface SF. As shown in FIG. 3, the more the particulate amount is, the greater the current value flowing between the electrode 122 and the electrode 123 is.

That is, there is a correlation shown in FIG. 3 between the particulate amount adhering to the adhesion surface SF and the current value detected by the ammeter 132. The current value is a physical quantity that correlates with the electrical resistance between the electrode 122 and the electrode 123. The particulate detection device 100 calculates the particulate amount using the detection value of the ammeter 132 and outputs information regarding the particulate amount. The controller 110 has a memory device (not shown) that remembers the correlation between the particulate amount adhering to the adhesion surface SF and the current value detected by the ammeter 132. The adhesion amount calculation section 111 converts the current value into the particulate amount.

The particulate amount is calculated based on the electrical resistance between the electrode 122 and the electrode 123. A physical quantity that is measured directly to calculate the electric resistance is not limited to the current value and may be another physical quantity correlating with the electric resistance.

Here, the current value detected by the ammeter 132 increases as the amount of the particulate 200 adhering to the adhesion surface SF of the electrical insulation part 124 increases. However, the current value does not increase up to infinity and is saturated when reaching a certain level. The certain level is shown as $I_{MAX}$ in FIG. 3. That is, the current value flowing between the electrode 122 and the electrode 123 stops increasing even when the adhesion amount of the particulate 200 keeps increasing. On this occasion, the adhesion amount of the particulate 200 cannot be calculated based on the current value.

Therefore, the particulate 200 adhering to the adhesion surface SF of the electrical insulation part 124 is required to be removed before the current value is saturated and reaches the maximum value ($I_{MAX}$). Then, the particulate detection device 100 of the present embodiment performs a treatment (i.e., the regeneration control) in order to remove the particulate 200 adhering to the adhesion surface SF. In the regeneration control, the heater 125 heats the sensor 121 to burn and remove the particulate 200.

Figure 4:
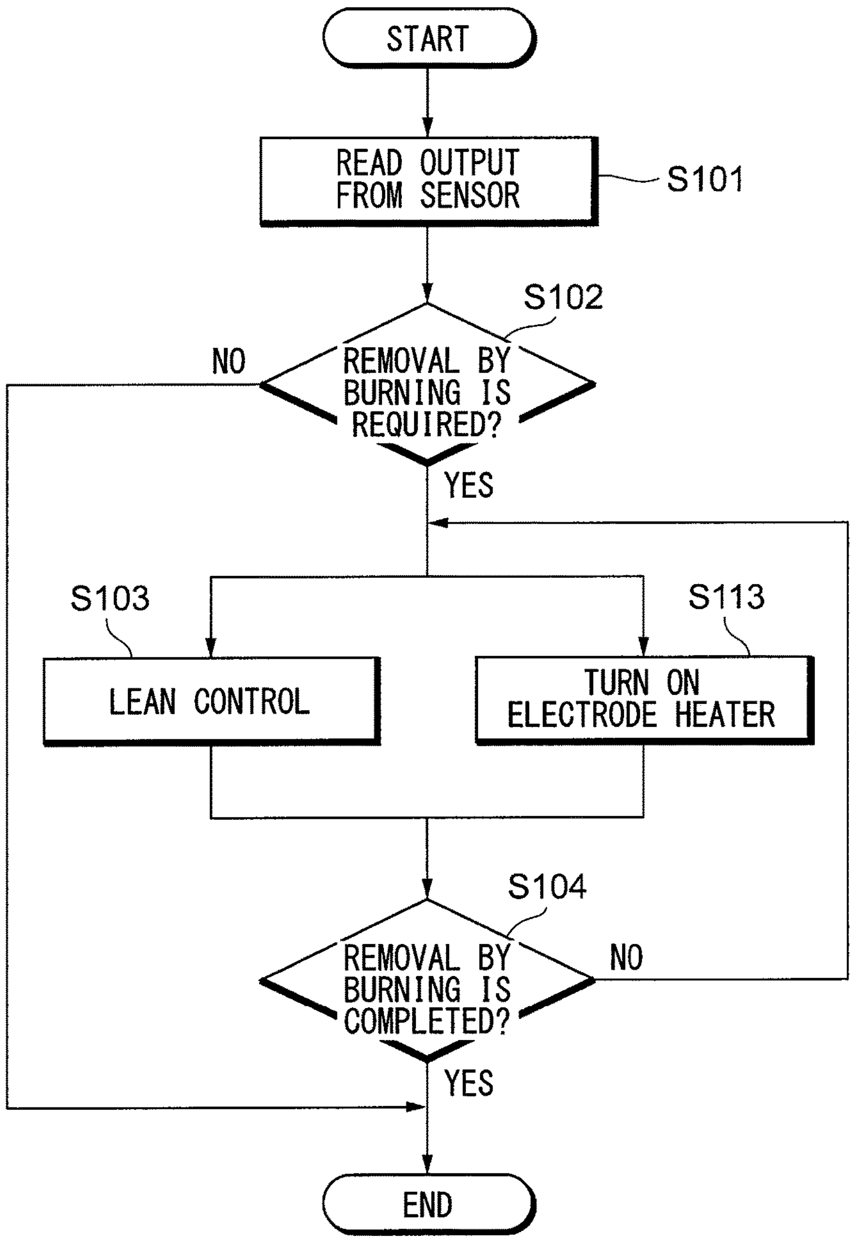
FIG. 4 is a flow chart showing a control flow performed by the particulate detection device according to the first embodiment.

The regeneration control will be described in detail hereafter referring to FIG. 4. The controller 110 performs a routine shown in FIG. 4 repeatedly at specified intervals.

At the first step S101, the adhesion amount calculation section 111 of the controller 110 reads the current value output from the ammeter 132. The adhesion amount calculation section 111 calculates the particulate adhesion amount corresponding to the read current value by referring to the correlation (refer to FIG. 3), which is stored in the controller 110, between the current value and the particulate adhesion amount.

Then the control flow advances from step S101 to step S102, and it is determined whether a removal of the particulate 200 by burning the particulate 200 is required or not based on the particulate adhesion amount calculated by the adhesion amount calculation section 111. Specifically, it is determined whether the calculated particulate adhesion amount is greater than a threshold value or not. The control flow shown in FIG. 4 ends when the calculated particulate adhesion amount is lower than the threshold value and the removal of the particulate 200 is determined not to be required. On the other hand, the control flow advances to step S103 and step S113 when the calculated particulate adhesion amount is greater than or equal to the threshold value and the removal of the particulate 200 is determined to be required. Treatments performed at step S103 and step S113 correspond to "the regeneration control" of the present disclosure.

At step S103, the air/fuel ratio control section 112 controls the engine 10 such that the air/fuel ratio in the engine 10 becomes lean with respect to the theoretical air/fuel ratio. Such control may be referred to as a lean control. For example, the air/fuel ratio control section 112 increases an opening degree of the throttle valve of the suction pipe 20 to increase a volume of air supplied to the engine 10, thereby a lean degree of the air/fuel ratio rises, i.e., the air/fuel ratio is further shifted to a lean side. The lean degree is a proportion of air to the mixture of the fuel and the air. Alternatively, a volume of the fuel injected by the injector 13 may be decreased to increase the air/fuel ratio. "The air/fuel ratio is lean" may mean a condition that the proportion of the air to the mixture at the condition is greater than the proportion of the air to the mixture at the theoretical air/fuel ratio. "The air/fuel ratio is rich" may mean a condition that the proportion of the air to the mixture at the condition is less than the proportion of the air to the mixture at the theoretical air/fuel ratio.

Here, the exhaust gas emitted from the cylinders 11 of the engine 10 includes oxygen by increasing the lean degree. However, oxygen is used for an oxidation reaction in the three-way catalyst 31 thereby the exhaust gas after passing through the three-way catalyst 31 may not include oxygen even when the lean degree is high. Then, a target value of the lean degree of the air/fuel ratio after being changed at step S103 may be set to a value that makes the exhaust gas after passing through the three-way catalyst 31 include oxygen. That is, the lean degree is increased at step S103 such that an amount of oxygen emitted from the cylinders 11 of the engine 10 becomes larger than an amount of oxygen used in the three-way catalyst 31.

A power supply to the heater 125 is started at step S113 that is initiated at the same time as step S103 is initiated. Accordingly, the heater 125 generates heat thereby a temperature of the heater 125 and a temperature of the electrical insulation part 124 rise. As a result, the particulate 200 adhering to the adhesion surface SF is heated.

The heated particulate 200 reacts with oxygen (i.e., is burnt) since oxygen is present around the particulate 200 and then being removed from the adhesion surface SF. The current value detected by the ammeter 132 gradually decreases, i.e., the electrical resistance between the electrode 122 and the electrode 123 gradually increases, as the adhesion amount of the particulate 200 adhering to the adhesion surface SF decreases.

The control flow advances to step S104 after step S103 and step S113, and then it is determined whether a removal of the particulate 200 by burning the particulate 200 is completed. Specifically, it is determined whether the particulate adhesion amount calculated based on the current value detected by the ammeter 132 is lower than a specified threshold value. The particulate adhesion amount is calculated in the same manner as step S101.

When the calculated particulate adhesion amount is greater than or equal to the threshold value, it is determined that the removal of the particulate 200 from the adhesion surface SF is not completed, and the regeneration control is continued by performing step S103 and step S113.

When the calculated particulate adhesion amount is smaller than the threshold value, it is determined that the removal of the particulate 200 from the adhesion surface SF is completed, and the regeneration control ends. Specifically, the power supply to the heater 125 is stopped. In addition, the target value of the air/fuel ratio in the engine 10 is reset to the theoretical air/fuel ratio. The control flow shown in FIG. 4 ends then.

As described above, according to the present embodiment, the amount of oxygen reaching the sensor 121 is increased in a manner that the air/fuel ratio in the engine 10 is shifted to the lean side with respect to the theoretical air/fuel ratio, i.e., the lean degree is increased temporary. At the same time, the power supply to the heater 125 is started thereby the temperature of the sensor 121 increases. As a result, the particulate 200 adhering to the adhesion surface SF of the sensor 121 is removed.

As a modification of a way to increase the lean degree at step S103, the engine 10 may be controlled such that the lean degree increases as the particulate adhesion amount calculated by the adhesion amount calculation section 111 increases. By the modification, the removal of the particulate 200 by burning the particulate 200 can be completed in a short time because the amount of oxygen reaching the sensor 121 increases as the particulate adhesion amount increases. Even when the particulate adhesion amount is small, the removal of the particulate 200 by burning the particulate 200 can be completed in a short time while an increase range of the lean degree is minimized.

Here, when the target value of the lean degree (%) is fixed, the amount of oxygen reaching the sensor 121 increases as the volume of air supplied to the engine 10 through the suction pipe 20 increases, i.e., the opening degree of the throttle valve increases. Then, the target value of the lean degree may be set based on the volume of the air supplied to the engine 10 at step S103. Specifically, the target value may be set such that a value, which is given by multiplying the volume of the air flowing in the suction pipe 20 by the target value (%) of the lean degree, is fixed.

In this case, both a duration in which the actual air/fuel ratio in the engine 10 does not coincide with the theoretical air/fuel ratio and a difference between the actual air/fuel ratio and the theoretical air/fuel ratio can be minimized while an enough amount of oxygen, which is enough to burn and remove the particulate 200 adhering to the adhesion surface SF, reaches the sensor 121.

Here, a temperature of the exhaust gas increases excessively and thereby a deterioration of the catalytic agents of the three-way catalyst 31 may be promoted, when the air/fuel ratio is shifted to the lean side on a condition that the volume of air supplied to the engine 10 is relatively large. Then, the regeneration control in which the lean degree is increased may be prohibited in an operation range (i.e., a high load range) in which the volume of air is larger than a specified volume.

Alternatively, the lean degree may be increased by adjusting the opening degree of the throttle valve while a fuel cut control is performed as to decrease a speed of the vehicle GC. The fuel cut control is a control that supplies only air to the engine 10 and thereby a load applied to the engine 10 is small. In this case, the lean degree can be increased, i.e., the regeneration control can be performed, while an increase of the temperature of the catalytic agents can be suppressed as to suppress an increase of the volume of air.

Second Embodiment

Figure 5:
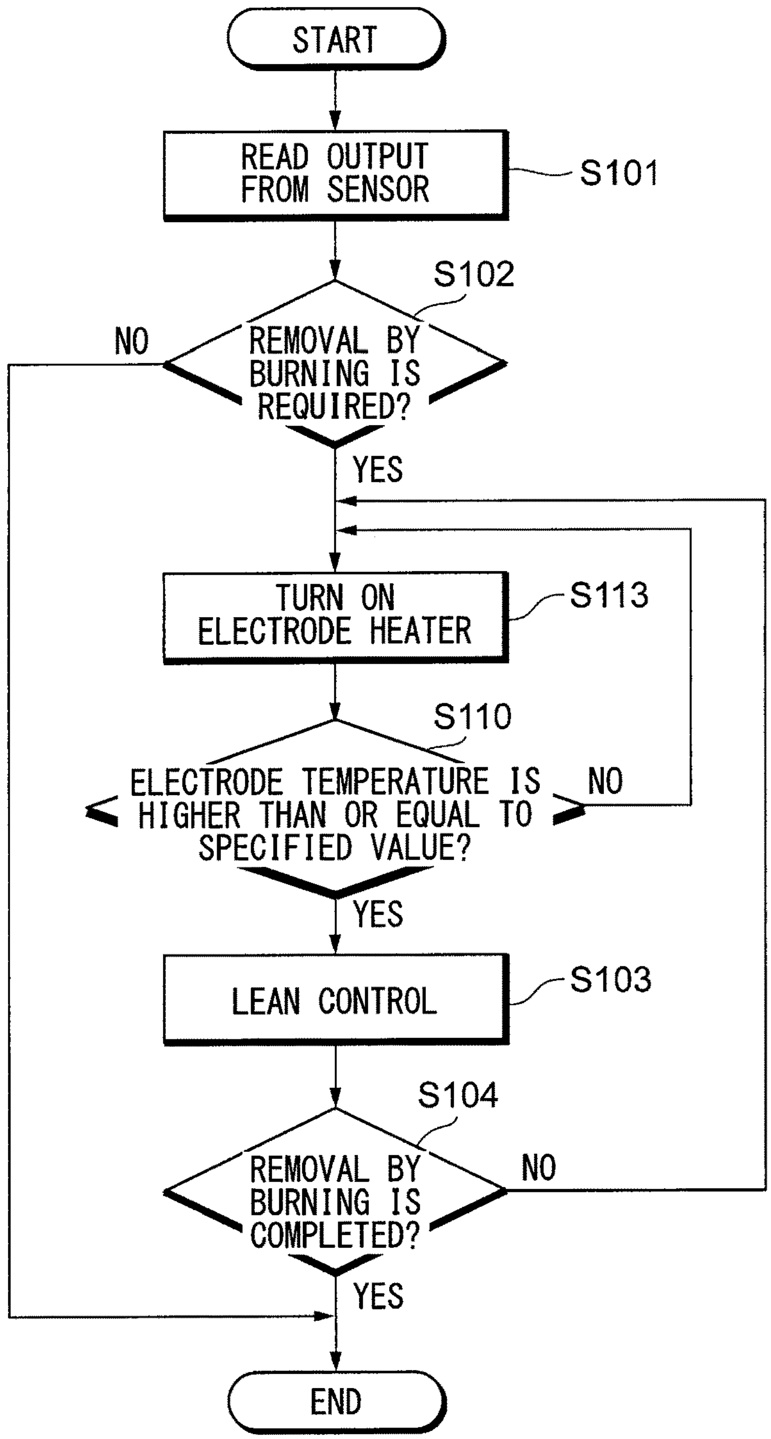
FIG. 5 is a flow chart showing a control flow performed by a particulate detection device according to a second embodiment.

A second embodiment of the present disclosure will be described hereafter referring to FIG. 5. According to the present embodiment, the regeneration control (especially sections regarding step S103 and step S113 shown in FIG. 4) is performed in a different order as compared to that of the first embodiment. Accordingly, descriptions about treatments (i.e., step S101 and step S102) performed before operating the regeneration control will be omitted.

According to the regeneration control of the present embodiment, the power supply to the heater 125 is started (at S113) before starting the treatment (at S103) increasing the lean degree of the air/fuel ratio. When the power supply is started, the temperature of the heater 125 and the temperature of the electrical insulation part 124 start rising. However, an oxygen concentration around the sensor 121 is almost zero since the target value of the air/fuel ratio of the engine 10 is kept to be the theoretical air/fuel ratio.

The control flow advances to step S110 after step S113, and it is determined whether a temperature of the sensor 121 (i.e., the electrical insulation part 124) detected by a temperature sensor (not shown) is higher than or equal to a specified threshold temperature. The threshold temperature is set as a lowest temperature in a range in which the particulate 200 can be burnt. When the temperature of the sensor 121 is higher than or equal to the threshold temperature, the control flow advances to step S103. When the temperature of the sensor 121 is lower than the threshold temperature, the control flow returns to step S113 and controls the heater 125 to continue generating heat.

At S103, the air/fuel ratio control section 112 controls the air/fuel ratio in the engine 10 to be lean as compared to the theoretical air/fuel ratio. This control is the same as the control performed at step S103 of the first embodiment (refer to FIG. 4).

The control flow advances to S104 after step S103, and it is determined whether the removal of the particulate 200 by burning the particulate 200 is completed. This determination is the same as the determination performed at step S104 of the first embodiment (refer to FIG. 4).

When the calculated particulate adhesion amount is determined to be larger than or equal to the threshold value at S104, the removal of the particulate 200 from the adhesion surface SF is determined not to be completed then the control flow returns to step S113 to continue the regeneration control.

When the calculated particulate adhesion amount is determined to be smaller than the threshold value at step S104, the removal of the particulate 200 from the adhesion surface SF is determined to be completed then the regeneration control ends. Specifically, the power supply to the heater 125 is stopped. In addition, the target air/fuel ratio in the engine 10 is reset to the theoretical air/fuel ratio. Subsequently, the routine shown in FIG. 5 ends.

As described above, according to the present embodiment, the air/fuel ratio in the engine 10 is shifted to the lean side with respect to the theoretical air/fuel ratio after the temperature of the electrical insulation part 124 becomes higher than or equal to the specified threshold temperature by being heated by the heater 125. In other words, the air/fuel ratio in the engine 10 is kept to be the theoretical air/fuel ratio while the temperature of the electrical insulation part 124 is low. As a result, a duration in which the air/fuel ratio is lean is shortened, and thereby a deterioration of drivability in conjunction with the regeneration control can be minimized.

The embodiments of the present disclosure are described above with specific examples. However, the present disclosure is not limited to the specific examples. That is, modifications that are made as required by a person having ordinary skill in the art based on the specific examples are included in a range of the present disclosure as long as having the features of the present embodiment. For example, elements mentioned in the specific examples, an arrangement, a material, a condition, a shape, a size, etc. of the elements are not limited to the specific examples, and can be changed as required. Elements mentioned in the specific examples can be combined as long as it is technically possible, and the combination is included in the range of the present disclosure as long as having the features of the present embodiment.

It should be understood that the present disclosure is described with the above-described embodiments however the present disclosure is not limited to have configurations described in the above-described embodiments. The present disclosure also includes various modifications and modifications within a scope of equivalent. In addition, various combination and embodiments, and other combinations and embodiments to which any elements are added are also included in a category and concept of the present disclosure.

The invention claimed is:

1. A particulate detection device that detects an amount of exhaust particulates emitted from an internal combustion engine, the particulate detection device comprising:

an insulation part that is located in an exhaust passage of the internal combustion engine and has an adhesion surface to which the exhaust particulates adhere;

a plurality of electrodes that are arranged to be distanced from each other on the adhesion surface;

an adhesion amount calculation section that calculates an adhesion amount of the exhaust particulates adhered to the insulation part based on an electrical resistance between two of the plurality of electrodes;

a heater that heats the insulation part; and a controller that controls an operation of the internal combustion engine and an operation of the heater, wherein the controller, in a normal control, controls an air/fuel ratio in the internal combustion engine to be a theoretical air/fuel ratio, the controller, in a regeneration control, controls the heater to increase a temperature of the insulation part and thereby removes the exhaust particulates, adhering to the insulation part, by burning the exhaust particulates, and controls the air/fuel ratio to be lean as compared to the theoretical air/fuel ratio.

2. The particulate detection device according to claim 1, further comprising a three-way catalyst that purifies exhaust gas, the three-way catalyst being located upstream of the insulation part in the exhaust passage, wherein the controller, in the regeneration control, controls the air/fuel ratio to make the exhaust gas after passing through the three-way catalyst include oxygen.

3. The particulate detection device according to claim 1, wherein the controller, in the regeneration control, controls the air/fuel ratio to be lean as compared to the theoretical air/fuel ratio after the temperature of the insulation part exceeds a specified threshold temperature.

4. The particulate detection device according to claim 1, wherein the controller, in the regeneration control, increases a lean degree of the air/fuel ratio as the adhesion amount of the exhaust particulates calculated by the adhesion amount calculating section increases.

5. The particulate detection device according to claim 4, wherein a target value of the lean degree in the regeneration control is set based on a volume of air supplied to the internal combustion engine.

* * * * *